(12) United States Patent
Ohtsuka et al.

(10) Patent No.: US 10,068,359 B2
(45) Date of Patent: Sep. 4, 2018

(54) INFORMATION PROCESSING DEVICE

(71) Applicant: Sharp Kabushiki Kaisha, Osaka-shi, Osaka (JP)

(72) Inventors: Kiyofumi Ohtsuka, Osaka (JP); Tadao Nagasawa, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/890,930

(22) PCT Filed: Aug. 19, 2014

(86) PCT No.: PCT/JP2014/071647
§ 371 (c)(1),
(2) Date: Nov. 13, 2015

(87) PCT Pub. No.: WO2015/045676
PCT Pub. Date: Apr. 2, 2015

(65) Prior Publication Data
US 2016/0117854 A1    Apr. 28, 2016

(30) Foreign Application Priority Data

Sep. 27, 2013   (JP) ................................ 2013-202482

(51) Int. Cl.
*G06F 17/28* (2006.01)
*H04M 1/00* (2006.01)
(Continued)

(52) U.S. Cl.
CPC ............ *G06T 11/60* (2013.01); *G06F 17/214* (2013.01); *G06F 17/289* (2013.01)

(58) Field of Classification Search
CPC .. G06F 17/289; G06F 9/4448; G06F 17/2247; G06Q 10/107; H04M 1/72522;
(Continued)

(56) References Cited

U.S. PATENT DOCUMENTS 5,241,674 A    8/1993   Kuorsawa et al.
5,748,805 A *  5/1998   Withgott ............... G06F 17/241
                                                382/306
(Continued)

FOREIGN PATENT DOCUMENTS

CN    101137983 A    3/2008
JP    03-271976 A    12/1991
(Continued)

OTHER PUBLICATIONS

Official Communication issued in International Patent Application No. PCT/JP2014/071647, dated Oct. 7, 2014.

*Primary Examiner* — Anne L Thomas-Homescu
(74) *Attorney, Agent, or Firm* — Keating & Bennett, LLP

(57) ABSTRACT

The present invention makes it possible to see an original text string which (i) is contained in a captured image and (ii) has been translated, even after a translation of the original text string is displayed. The text string decoration display control section (12) decorates a part indicating a text string contained in a captured image and causes the decorated part to be displayed. The translation image generating section (13) generates a translation image showing a result of translating the text string into another language. The translation display control section (16) switches between display and non-display of the translation image in accordance with an input carried out by a user.

14 Claims, 6 Drawing Sheets

(51) Int. Cl.
  *H04W 4/00*  (2018.01)
  *G06K 9/00*  (2006.01)
  *G06K 9/54*  (2006.01)
  *G06T 11/60*  (2006.01)
  *G06F 17/21*  (2006.01)

(58) Field of Classification Search
  CPC ........... H04W 4/14; G06T 2207/10016; G09G 2340/0407
  See application file for complete search history.

(56) References Cited

U.S. PATENT DOCUMENTS

| | | | |
|---|---|---|---|
| 6,993,473 B2* | 1/2006 | Cartus | G06F 17/24 704/2 |
| 8,073,678 B2* | 12/2011 | Masuichi | G06F 17/2809 704/2 |
| 8,761,513 B1* | 6/2014 | Rogowski | G06F 17/2854 382/135 |
| 2001/0041005 A1 | 11/2001 | Fujiwara | |
| 2003/0200078 A1* | 10/2003 | Luo | G06F 17/2863 704/2 |
| 2006/0173829 A1 | 8/2006 | Neeman | |
| 2007/0216712 A1* | 9/2007 | Louch | G06F 3/0481 345/660 |
| 2008/0082317 A1* | 4/2008 | Rosart | G06F 17/289 704/8 |
| 2008/0195372 A1* | 8/2008 | Chin | G06F 17/289 704/2 |
| 2008/0233980 A1* | 9/2008 | Englund | G06F 17/289 455/466 |
| 2010/0204979 A1* | 8/2010 | Chiu | G06F 3/0481 704/3 |
| 2012/0088543 A1* | 4/2012 | Lindner | G06F 17/289 455/556.1 |
| 2012/0123765 A1* | 5/2012 | Estelle | G06F 17/2818 704/3 |
| 2012/0245922 A1* | 9/2012 | Kozlova | G06F 17/289 704/3 |
| 2012/0250943 A1 | 10/2012 | Aomi | |
| 2013/0039537 A1 | 2/2013 | Yamazaki et al. | |
| 2013/0132825 A1* | 5/2013 | Masuko | G06F 17/211 715/236 |
| 2014/0056475 A1* | 2/2014 | Jang | G06K 9/18 382/103 |
| 2014/0081619 A1* | 3/2014 | Solntseva | G06F 17/289 704/3 |
| 2014/0081620 A1* | 3/2014 | Solntseva | G06F 17/28 704/3 |
| 2014/0337008 A1* | 11/2014 | Morimoto | G06K 9/6807 704/3 |
| 2015/0134318 A1* | 5/2015 | Cuthbert | G06F 17/289 704/2 |
| 2015/0134323 A1* | 5/2015 | Cuthbert | G06F 17/289 704/3 |
| 2015/0186346 A1* | 7/2015 | Mesguich Havilio | G06F 3/04842 715/256 |
| 2015/0309720 A1* | 10/2015 | Fisher | G06F 3/04845 715/752 |
| 2016/0321246 A1* | 11/2016 | Satoh | G06K 9/348 |

FOREIGN PATENT DOCUMENTS

| | | |
|---|---|---|
| JP | 09-179867 A | 7/1997 |
| JP | 11-053365 A | 2/1999 |
| JP | 2001-319240 A | 11/2001 |
| JP | 2008-054236 A | 3/2008 |
| JP | 2011-134144 A | 7/2011 |
| JP | 2013-122747 A | 6/2013 |

\* cited by examiner

INFORMATION PROCESSING DEVICE

TECHNICAL FIELD

The present invention relates to an information processing device and a control program.

BACKGROUND ART

There have conventionally and variously been proposed techniques for (i) extracting, by OCR (Optical Character Recognition), a text string from a captured image and (ii) displaying a result of translation of the text string. For example, Patent Literature 1 proposes an image processing device including (i) a character recognition section for (a) recognizing a character region of an image which character region contains a character and (b) generating a character code, (ii) a detection section for detecting a region of the image in which region a little change occurs in feature, and (iii) an arrangement section for arranging, in the region above detected, data obtained based on the character code.

CITATION LIST

Patent Literature

Patent Literature 1
Japanese Patent Application Publication, Tokukai, No. 2013-122747 (Publication date: Jun. 20, 2013)
Patent Literature 2
Japanese Patent Application Publication, Tokukai, No. 2011-134144 (Publication date: Jul. 7, 2011)
Patent Literature 3
Japanese Patent Application Publication, Tokukai, No. 2001-319240 (Publication date: Nov. 16, 2001)
Patent Literature 4
Japanese Patent Application Publication, Tokukaihei, No. 11-53365 (Publication date: Feb. 26, 1999)
Patent Literature 5
Japanese Patent Application Publication, Tokukaihei, No. 9-179867 (Publication date: Jul. 11, 1997)

SUMMARY OF INVENTION

Technical Problem

However, according to the conventional technique as described earlier, a text string which has been translated is displayed so as to be superimposed on a region of a captured image which region has contained a text string which has not been translated. This causes a problem that it is difficult to see an original text string which (i) is contained in a captured image and (ii) has been translated, after a translation of the original text string is displayed.

The present invention has been made in view of the problem, and an object of the present invention is to provide an information processing device which makes it possible to easily see an original text string which (i) is contained in a captured image and (ii) has been translated, even after a translation of the original text string is displayed.

Solution to Problem

An information processing device in accordance with an aspect of the present invention includes: a text string decoration display control unit for causing a decorated image to be displayed in which a part indicating a text string contained in a captured image has been decorated; a translation image generating section for generating a translation image which is an image showing a result of translating the text string into another language; and a translation display control section for causing the translation image corresponding to the text string to be displayed such that the translation image is superimposed on the part indicating the text string which is contained in the captured image or in the decorated image decorated by the text string decoration display control section, the translation display control section switching between display and non-display of the translation image in accordance with an input carried out by a user, and the text string decoration display control section causing the decorated image to be displayed in a case where the translation display control section has caused the translation image not to be displayed.

Advantageous Effects of Invention

An aspect of the present invention brings about an effect of allowing a user to easily see which text string has been translated, even after a translation of the text string contained in a captured image is displayed.

DESCRIPTION OF EMBODIMENTS

Embodiment 1

Figure 1:
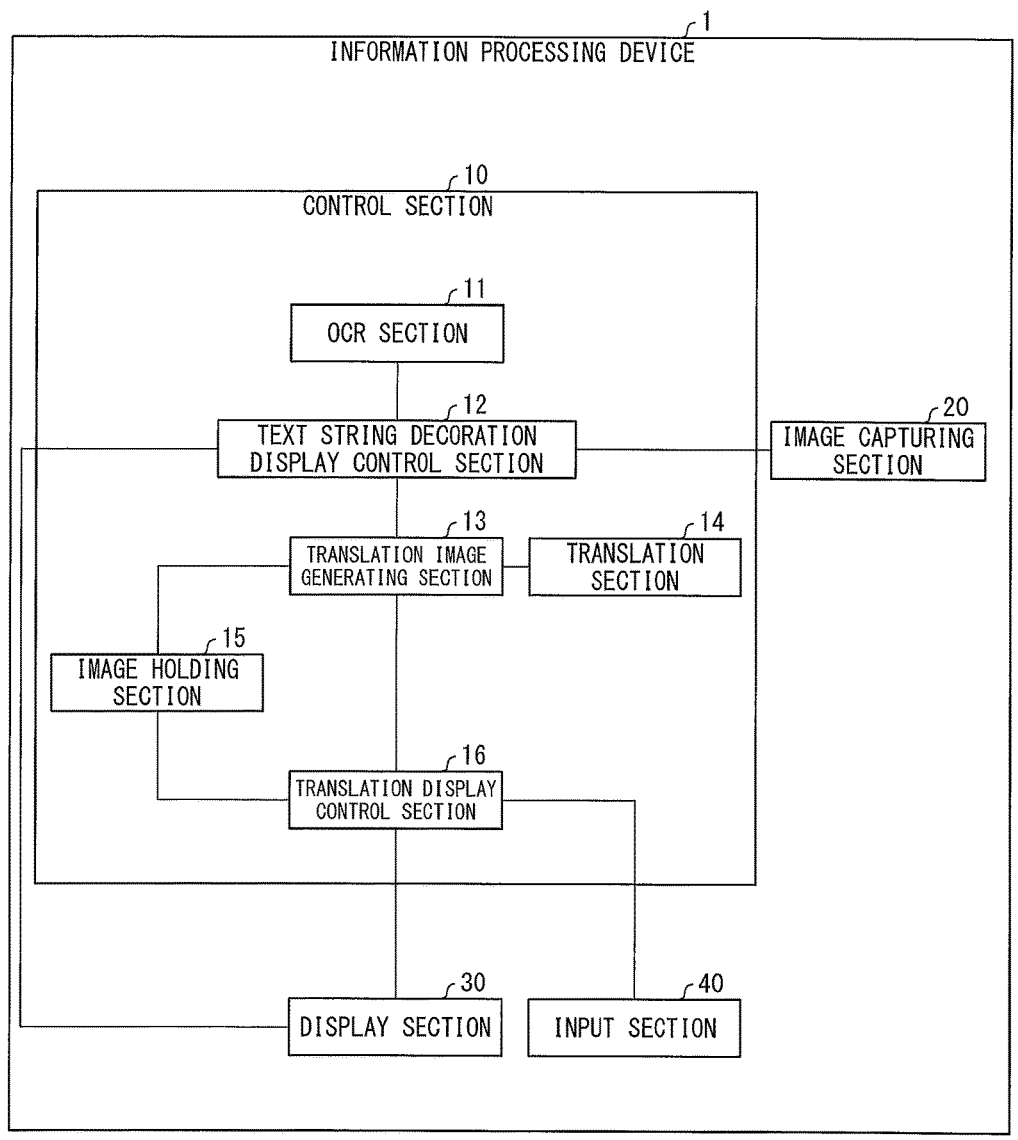
FIG. 1 is a functional block diagram in accordance with Embodiment 1 of the present invention.
Figure 2:
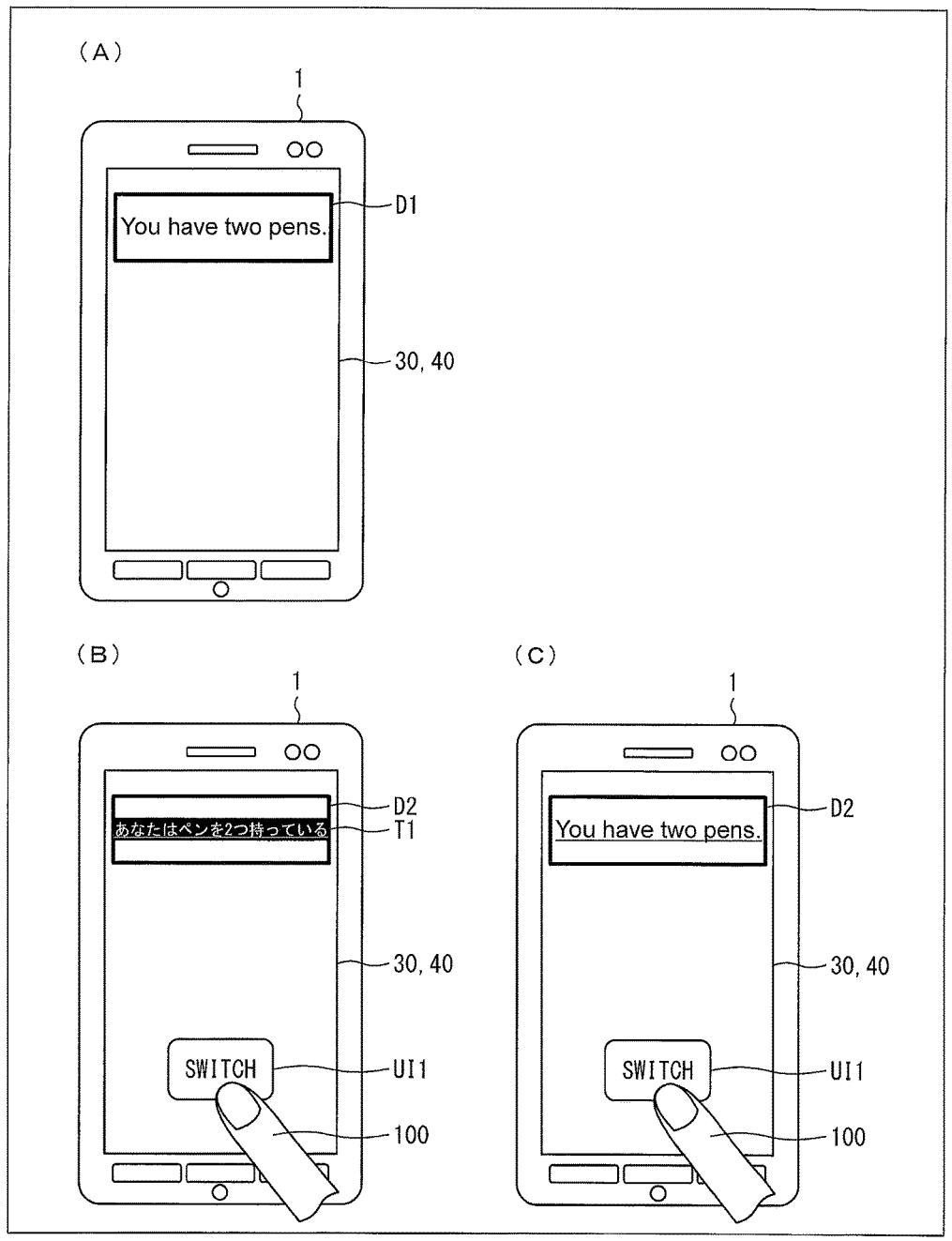
FIG. 2 shows switching of a display image which switching is to be carried out by an information processing device in accordance with Embodiment 1 of the present invention.
Figure 3:
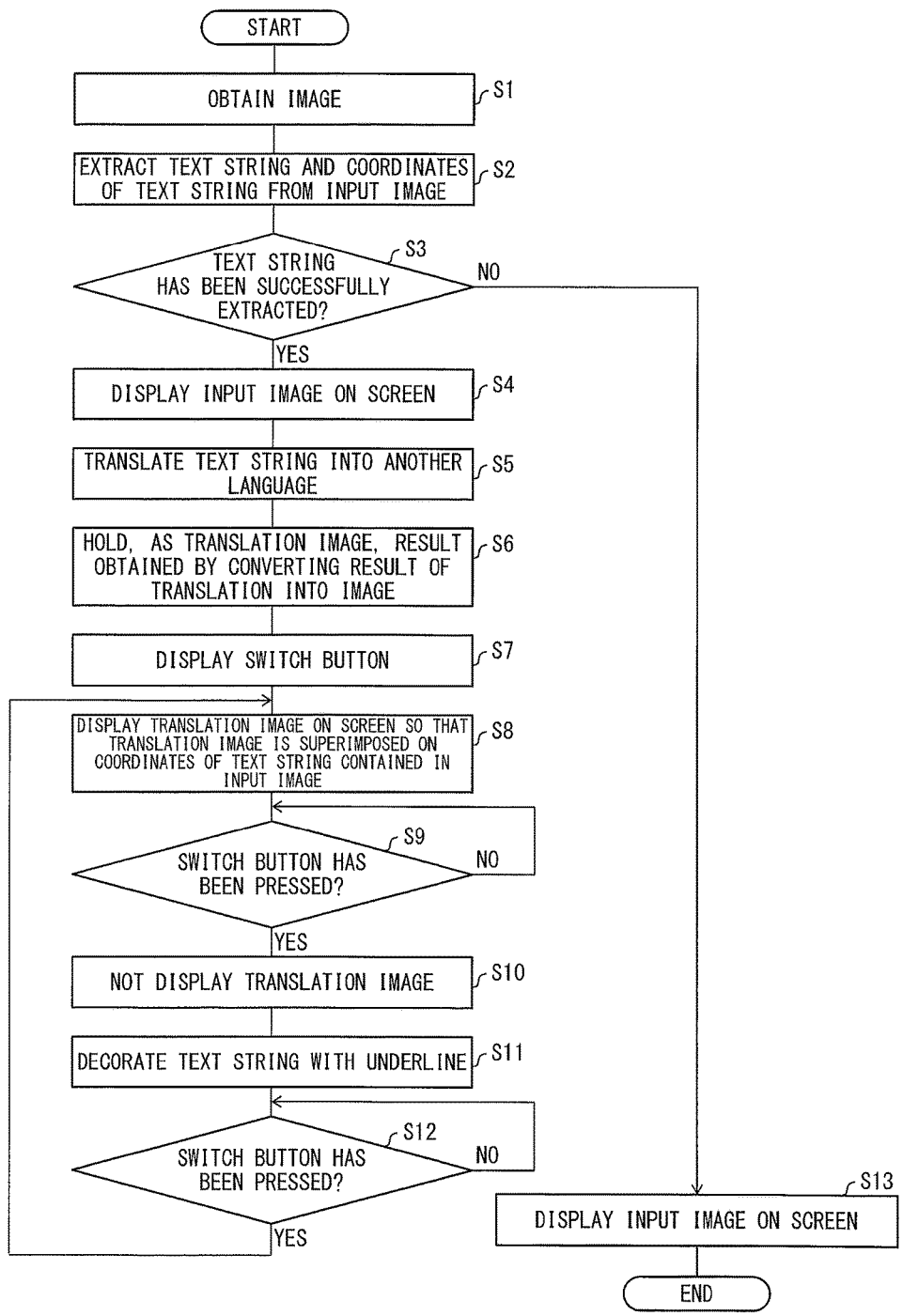
FIG. 3 is a flow chart showing a process flow for displaying a translation image in the information processing device in accordance with Embodiment 1 of the present invention.

The following description discusses an embodiment of the present invention with reference to FIGS. 1 through 3.

[1. Configuration of Information Processing Device 1]

First, while schematically discussing a configuration of an information processing device 1 with reference to FIG. 1, the following description discusses as appropriate, with reference to FIG. 2, a specific example of a display image to be displayed by the information processing device 1. FIG. 1 schematically illustrates the configuration of the information processing device 1 in accordance with Embodiment 1. FIG. 2 shows switching of a display image which switching is to be carried out by the information processing device 1.

As illustrated in FIG. 1, the information processing device 1 is made up of a control section 10, an image capturing section 20, a display section 30, and an input section 40. Examples of the information processing device 1 encompass a mobile phone, a smartphone, a PDA (Personal Data Assistant), and a PC (Personal Computer).

The image capturing section 20 provides a camera function for obtaining an image by taking a photograph of an object. The image capturing section 20 can be realized by, for example, an optical system or an image pickup device (CCD (Charge Coupled Devices), CMOS (Complementary Metal-Oxide-Semiconductor), etc.).

The display section 30 receives information of a display image from the control section 10 and displays the display image on a display screen. The display section 30 includes (i) a display element such as an LCD (Liquid Crystal Display) or an EL (Electroluminescence) display and (ii) a driver circuit for driving the display element in accordance with received image data.

The input section 40 accepts an input which has been carried out by a user and supplies, to the control section 10, information which has been inputted by the user. The input section 40 is made up of a touch panel in which a conversion system such as an electrostatic induction system, a resistance film system, or an optical system is employed. The input section 40 (i) only needs to have an interface via which coordinates of a display image or an item, which is displayed in the display section 30, is selectable and (ii) can be made up of, for example, a button, a keyboard, or a mouse.

As illustrated in FIG. 1, the control section 10 includes an OCR section 11, a text string decoration display control section 12, a translation image generating section 13, a translation section 14, an image holding section 15, and a translation display control section 16. The OCR section 11 specifies (extracts), by optical text recognition, a text string contained in an inputted image. Further, the OCR section 11 specifies text recognition information including (i) coordinates of a part indicating the extracted text string thus extracted and (ii) the text string, and then supplies the text recognition information to the text string decoration display control section 12. In a case where the OCR section 11 has failed to specify text recognition information, i.e., the OCR section 11 has failed to extract a text string contained in the inputted image and coordinates of the text string, the OCR section 11 notifies the text string decoration display control section 12 that the OCR section 11 has failed to specify a part indicating the text string, i.e., the OCR section 11 has failed to extract the text string. Further, the OCR section 11 can use a service on a communication network.

The text string decoration display control section 12 (i) supplies, to the OCR section 11, an image (hereinafter referred to as an "input image") which has been captured by the image capturing section 20 and supplied to the text string decoration display control section 12 and (ii) obtains text recognition information of the input image. In a case where the text string decoration display control section 12 has obtained the text recognition information and a translation image is not displayed, the text string decoration display control section 12 (i) decorates (i.e., underlines), in accordance with the text recognition information, a part indicating a text string contained in the input image and (ii) causes the display section 30 to display an image in which the part indicating the text string is decorated. Further, the text string decoration display control section 12 supplies the text recognition information to the translation image generating section 13. Meanwhile, in a case where the text string decoration display control section 12 is notified by the OCR section 11 that the input image does not contain a part indicating a text string, the text string decoration display control section 12 causes the display section 30 to display the input image. For example, in a case where the OCR section 11 has failed to specify a part indicating a text string contained in the input image, the input image is displayed as it is, as an image D1, in the display section 30 (see (A) of FIG. 2).

(C) of FIG. 2 illustrates a display image to be displayed in the display section 30 in a case where the OCR section 11 has successfully specified a part indicating a text string contained in the input image. In this case, a part indicating a text string "You have two pens." contained in the input image is underlined. This facilitates discrimination of the part indicating the text string contained in the input image. In a case where an underline is used to decorate a part indicating a text string contained in an input image, only a small portion of the input image is to be hidden by the decoration, and this hardly causes a reduction in visible information by the decoration of the input image.

The translation image generating section 13, which has received text recognition information, (i) supplies, to the translation section 14, a text string indicated by the text recognition information and (ii) obtains a result of translating the text string into another language. When the translation image generating section 13 has obtained the result of translating the text string indicated by the text recognition information into another language, the translation image generating section 13 (i) generates a translation image showing the result of the translation and (ii) causes the image holding section 15 to hold the translation image. The translation image generating section 13 (i) notifies the translation display control section 16 that the translation image has been generated and (ii) supplies, to the translation display control section 16, coordinates of the text string contained in the text recognition information. Note that a translation image is based on text recognition information, and therefore the translation image corresponds to a part of a region of an input image which part indicates a text string.

In a case where a text string supplied to the translation section 14 is a translatable text string, the translation section 14 translates the text string into another predetermined language and supplies a result of the translation to the translation image generating section 13. The translation section 14 is made up of a translation engine. Further, the translation section 14 can use a service on a communication network.

The image holding section 15 holds a translation image generated by the translation image generating section 13. The image holding section 15 can be a region which is set in a RAM (Random Access Memory) constituting a part of the control section 10.

In a case where the translation display control section 16 has been notified by the translation image generating section 13 that a translation image has been generated, the translation display control section 16 (i) causes the translation image held by the image holding section 15 to be displayed while being superimposed on a part indicating a text string contained in a decorated image and (ii) causes a switch button UI1 to be displayed. In a case where the translation display control section 16 has been notified by the input section 40 that the switch button UI1 has been pressed (selected), for example, with a user's finger 100 which has been brought into contact at coordinates corresponding to the switch button UI1, the translation display control section 16 switches between display and non-display of the translation image.

For example, (B) of FIG. 2 illustrates the information processing device 1 in which (i) a translation image T1 held by the image holding section 15 is displayed while being superimposed on a part indicating a text string contained in an image D2 displayed in the display section 30 and (ii) the switch button UI1 is displayed. In a case where the user's finger 100 has been brought into contact with the switch button UI1 in this state, the translation image T1 is not displayed and the image D2 in which the part indicating the text string has been underlined is displayed as illustrated in (C) of FIG. 2. Further, in a case where the user's finger 100 has been brought into contact with the switch button UI1 in this state, the translation image T1 is displayed again as illustrated in (B) of FIG. 2.

[2. Process Flow for Displaying Translation Image in Information Processing Device 1]

The following description discusses, with reference to FIG. 3, a process flow for displaying a translation image in the information processing device 1. FIG. 3 is a flow chart showing a process flow for displaying a translation image in the information processing device 1.

First, the text string decoration display control section 12 obtains an image captured by the image capturing section 20 (S1). Subsequently, the text string decoration display control section 12 supplies the obtained image (input image) to the OCR section 11. The OCR section 11, which has received the input image, extracts (i) a text string contained in the input image and (ii) coordinates of the text string (S2).

The OCR section 11 determines whether or not the text string and the coordinates of the text string have been successfully extracted (S3). In a case where the text string and the coordinates of the text string have been failed to be extracted (NO in S3), the OCR section 11 notifies the text string decoration display control section 12 that the extraction of the text string has been failed. The text string decoration display control section 12, which has received the notification, causes the display section 30 to display the input image (S13).

Meanwhile, in a case where the text string and the coordinates of the text string have been successfully extracted (YES in S3), the OCR section 11 notifies the translation image generating section 13 that the text string and the coordinates of the text string have been successfully extracted. The text string decoration display control section 12, which has received the notification, (i) causes the display section 30 to display the input image (S4) and (ii) supplies text recognition information to the translation image generating section 13.

The translation image generating section 13, which has received the text recognition information, supplies, to the translation section 14, a text string indicated by the text recognition information. The translation section 14, which has received the text string, (i) translates the text string into another predetermined language (S5), and (ii) supplies a result of the translation to the translation image generating section 13.

The translation image generating section 13, which has received the result of the translation, (i) generates a translation image which is an image showing the result of the translation and (ii) causes the image holding section 15 to hold the translation image (S6). Further, the translation image generating section 13 (i) notifies the translation display control section 16 that the translation image has been generated and (ii) supplies, to the translation display control section 16, coordinates of the text string contained in the text recognition information.

The translation display control section 16, which has been notified by the translation image generating section 13 that the translation image had been generated, causes the switch button UI1 to be displayed (S7). Further, the translation display control section 16 causes, in accordance with the coordinates of the text string supplied from the translation image generating section 13, the translation image held by the image holding section 15 to be displayed while being superimposed on a part indicating the text string contained in the input image displayed in the display section 30 (S8). At this point, the input image is displayed in which the translation image is displayed so as to be superimposed on the part indicating the text string.

Subsequently, the translation display control section 16 checks a notification received from the input section 40 and determines whether or not the switch button UI1 has been pressed (S9). In a case where the switch button UI1 has not been pressed (NO in S9), the translation display control section 16 determines again whether or not the switch button UI1 has been pressed (S9).

Meanwhile, in a case where the switch button has been pressed (YES in S9), the translation display control section 16 does not display the translation image (S10), and notifies the text string decoration display control section 12 that the switch button has been pressed. The text string decoration display control section 12, which has been notified that the switch button had been pressed, decorates (i.e., underlines), in accordance with the text recognition information, the part indicating the text string contained in the displayed input image (S11). At this point, the decorated input image is displayed in which the part indicating the text string has been underlined.

In this state, the translation display control section 16 checks a notification received from the input section 40 and determines whether or not the switch button UI1 has been pressed (S12). In a case where the switch button UI1 has not been pressed (NO in S12), the translation display control section 16 determines again whether or not the switch button UI1 has been pressed (S12).

Meanwhile, in a case where the switch button has been pressed (YES in S12), the translation display control section 16 displays the translation image so that the translation image is superimposed on the part indicating the text string (S8). At this point, the text string decoration display control section 12 can cancel the decoration of the part indicating the text string.

According to the above processes, in a state where a translation image corresponding to a text string contained in a captured image (input image) is displayed while being superimposed on a part indicating the text string contained in the captured image, it is possible to switch between (i) displaying an image in which the part indicating the text string contained in the captured image is decorated while the translation image is not displayed and (ii) displaying the translation image. This allows a user to easily see which text string has been translated, even after a translation of the text string contained in a captured image is displayed.

Modified Example

In Embodiment 1, the information processing device 1 can be configured such that an operation to switch between display and non-display of a translation image is carried out by, for example, (i) carrying out a so-called flick operation, (ii) shaking the information processing device 1, or (iii) rotating the information processing device 1, instead of by pressing the switch button. In Embodiment 1, the information processing device 1 can be configured such that a part indicating a text string contained in an input image is decorated by, for example, being highlighted with a marker or surrounded with a frame line.

In Embodiment 1, the information processing device 1 can be configured such that an image captured by the image capturing section 20 is processed and then the processed image is supplied to the text string decoration display control section 12.

Embodiment 2

Figure 4:
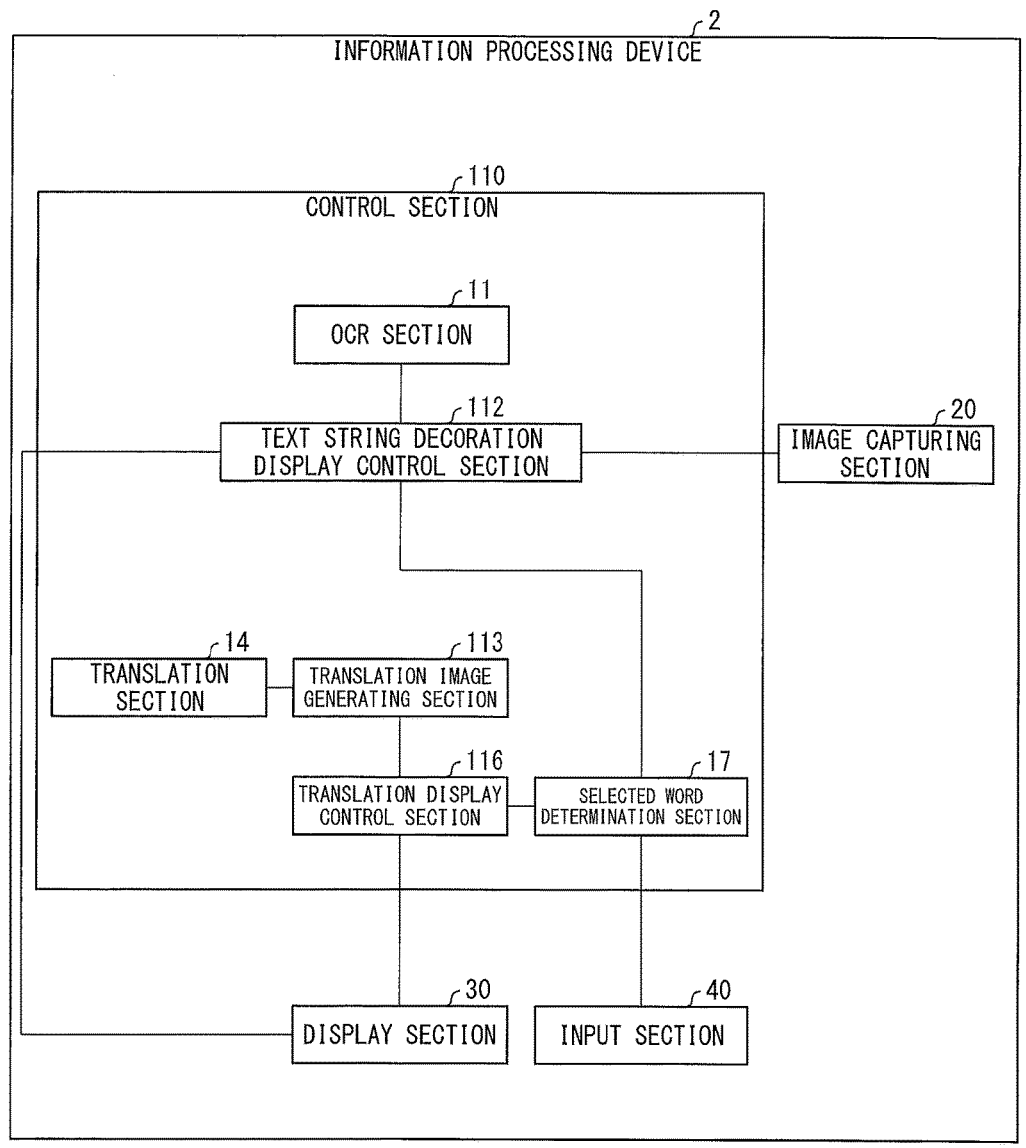
FIG. 4 is a functional block diagram in accordance with Embodiment 2 of the present invention.
Figure 5:
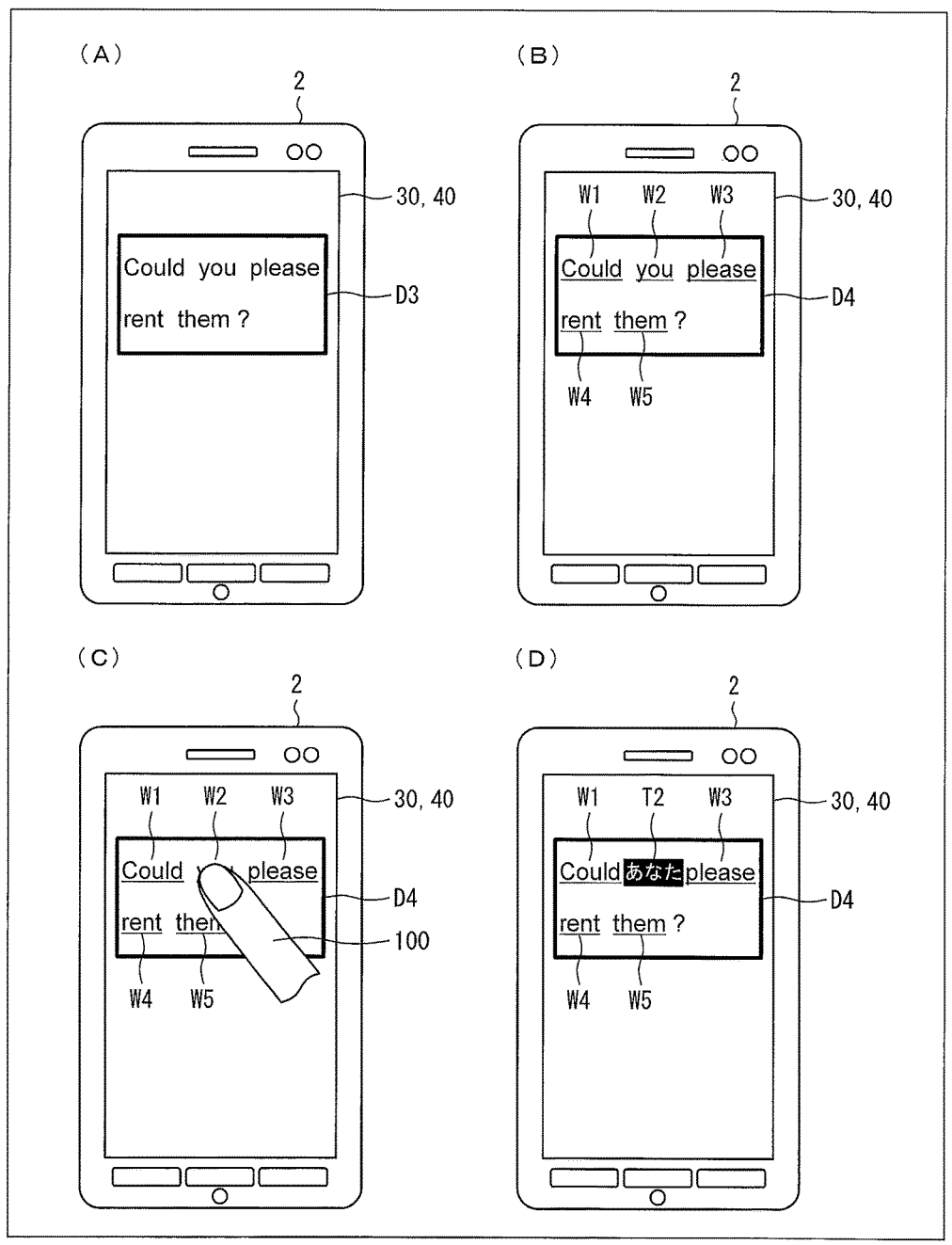
FIG. 5 shows switching of a display image which switching is to be carried out by an information processing device in accordance with Embodiment 2 of the present invention.
Figure 6:
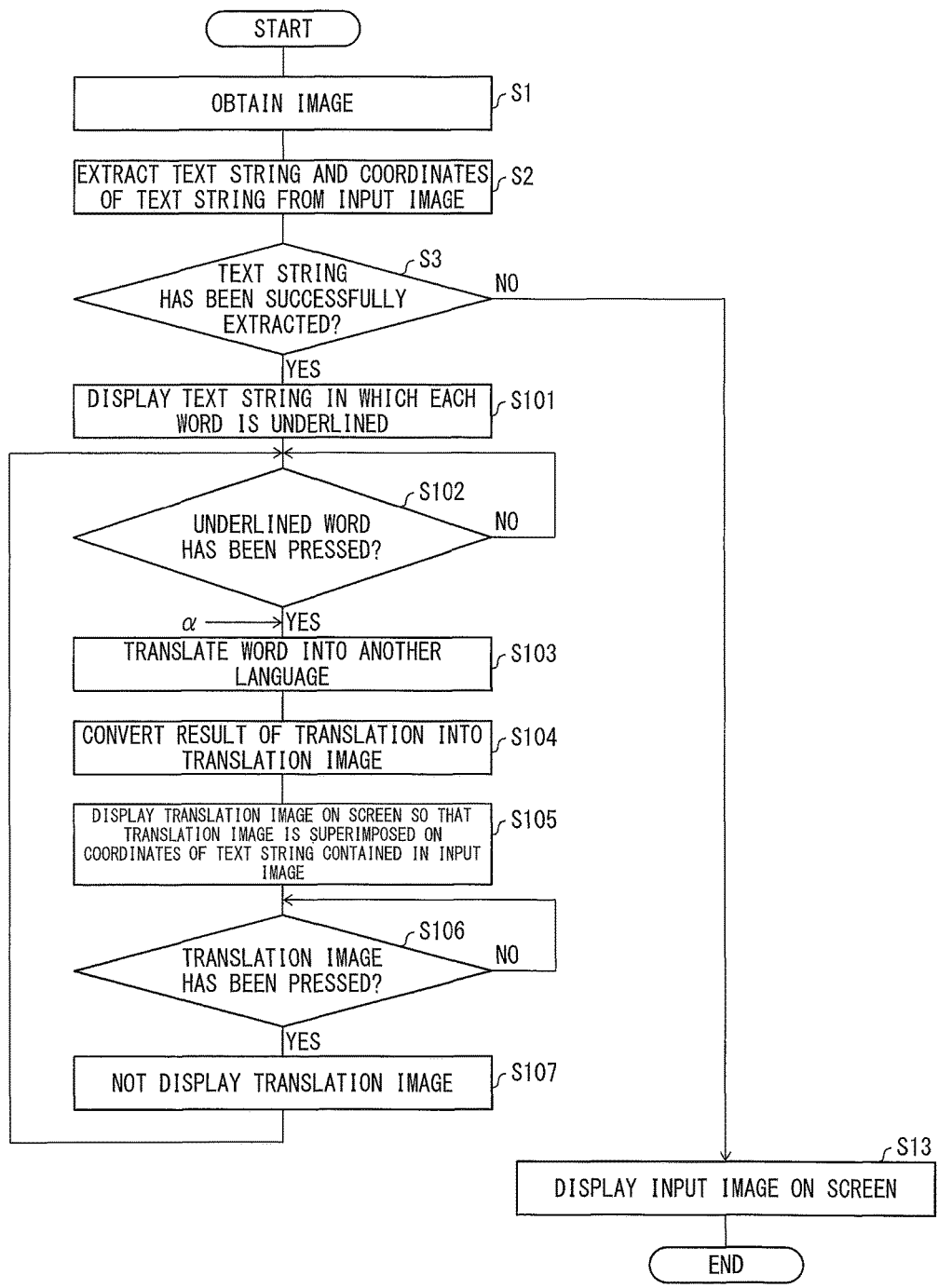
FIG. 6 is a flow chart showing a process flow for displaying a translation image in the information processing device in accordance with Embodiment 2 of the present invention.

The following description discusses another embodiment of the present invention with reference to FIGS. 4 through 6. Note that, for convenience, members that have identical functions to those of Embodiment 1 are given identical reference numerals, and are not explained repeatedly.

[1. Configuration of Information Processing Device 2]

In regard to a schematic configuration of the information processing device 2, while schematically discussing a configuration of an information processing device 1 with reference to FIG. 4, the following description discusses as appropriate, with reference to FIG. 5, a specific example of an operation of the information processing device 2. FIG. 4 schematically illustrates the configuration of the information processing device 2 in accordance with Embodiment 2. FIG. 6 shows switching of a display image which switching is to be carried out by the information processing device 2.

The information processing device 2 in accordance with Embodiment 2 differs from the information processing device 1 in that the information processing device 2 includes a control section 110 instead of the control section 10. The control section 110 differs from the control section 10 in that the information processing device 2 (i) does not include the image holding section 15, (ii) includes a text string decoration display control section 112, a translation image generating section 113, and a translation display control section 116, instead of the text string decoration display control section 12, the translation image generating section 13, and the translation display control section 16, respectively, and (iii) further includes a selected word determination section 17.

The text string decoration display control section 112 differs from the text string decoration display control section 12 in that the text string decoration display control section 112 (i) processes, for each word, text recognition information obtained from an OCR section 11 and (ii) supplies the text recognition information to the selected word determination section 17. Specifically, when the text string decoration display control section 112 has obtained, from an image capturing section, an image D3 illustrated in (A) of FIG. 5, the text string decoration display control section 112 causes a display section 30 to display an image D4 in which displayed words W1 through W5 are each decorated with an underline as illustrated in (B) of FIG. 5. Further, the text string decoration display control section 112 supplies text recognition information of each word to the selected word determination section 17.

The translation image generating section 113 receives an input of text recognition information from the translation display control section 116. The translation image generating section 113, which has received the input of the text recognition information, (i) supplies, to a translation section 14, a word contained in the text recognition information, (ii) obtains a result of translation of the word, and then (iii) generates a translation image. The translation image generating section 113, which has generated the translation image, supplies the translation image to the translation display control section 116.

The translation display control section 116 receives an input of text recognition information from the selected word determination section 17. The translation display control section 116 (i) supplies the text recognition information to the translation image generating section 113 which has received an input of the text recognition information and (ii) obtains a translation image from the translation image generating section 113. The translation display control section 116, which has obtained the translation image, causes the translation image in accordance with the text recognition information to be displayed while being superimposed on coordinates of a word corresponding to the translation image. Specifically, in a case where the translation display control section 116 has received an input of text recognition information corresponding to the displayed word W2 in a state shown in (B) of FIG. 5, the translation display control section 116 causes a translation image T2 to be displayed while being superimposed on the displayed word W2 as illustrated in (D) of FIG. 5. In a case where the displayed translation image has been selected, the translation display control section 116 does not display the translation image.

The selected word determination section 17 receives an input of text recognition information from the text string decoration display control section 112. In a case where an input carried out by a user via an input section 40 is an operation to select display of a word or display of a translation image (e.g., an operation to press coordinates of a word corresponding to the translation image), the selected word determination section 17, which has received the input of the text recognition information, supplies, to the translation display control section 116, text recognition information corresponding to the displayed word which has been selected.

[2. Process Flow for Displaying Translation Image in Information Processing Device 2]

The following description discusses, with reference to FIG. 3, a process flow for displaying a translation image in the information processing device 2. FIG. 3 is a flow chart showing a process flow for displaying a translation image in the information processing device 1. Note that processes in S1 through S3 and S13 are identical to those carried out in the information processing device 1, and are thus not explained repeatedly.

In a case where the OCR section 11 has successfully extracted a text string (YES in S3), the translation image generating section 13, which has been notified that the OCR section 11 had successfully extracted the text string, causes the display section 30 to display an input image in which each word contained in obtained text recognition information is decorated with an underline (S101). Further, the text string decoration display control section 112 supplies text recognition information of each word to the selected word determination section 17.

The selected word determination section 17, which has received the input of the text recognition information of each word, determines whether or not an input carried out by a user via the input section 40 is an operation to press a displayed word (S102). In a case where the input carried out by the user via the input section 40 is not the operation to press a displayed word (NO in S102), the selected word determination section 17 determines again whether or not the input carried out by the user via the input section 40 is the operation to press a displayed word (S102).

Meanwhile, in a case where the input carried out by the user via the input section 40 is the operation to press a displayed word (YES in S102), text recognition information corresponding to the displayed word which has been selected is supplied to the translation display control section 116. The translation display control section 116 supplies text recognition information to the translation image generating section 113 which has received an input of the text recognition information. The translation image generating section 113 (i) supplies, to the translation section 14, a word contained in the text recognition information and (ii) causes the translation section 14 to translate the word (S103).

The translation image generating section 113, which has obtained a result of the translation, converts the result of translation into a translation image (S104), and supplies the translation image to the translation display control section 116. The translation display control section 116, which has obtained the translation image, causes the translation image in accordance with the text recognition information to be displayed while being superimposed on coordinates of the word corresponding to the translation image (S105).

Subsequently, the selected word determination section 17 determines whether or not an input carried out by a user via the input section 40 is an operation to press the coordinates of the word corresponding to the translation image, i.e., an operation to press the displayed translation image (S106). In a case where the input carried out by the user via the input section 40 is not the operation to press the displayed translation image (NO in S106), the translation display control section 116 determines again whether or not the input carried out by the user via the input section 40 is the operation to press the displayed translation image (S106).

Meanwhile, in a case where the input carried out by the user via the input section 40 is the operation to press the displayed translation image (YES in S106), the selected word determination section 17 notifies the translation display control section 116 of text recognition information corresponding to the translation image. The translation display control section 116, which has been notified of the text recognition information, causes the displayed translation corresponding to the text recognition information not to be displayed (S107). Subsequently, the processes from S102 to S107 are carried out again.

According to the above processes, a translation image corresponding to a displayed word which has been selected by a user is displayed while being superimposed on the displayed word. This allows the user to display a translation image of a word that is desired by the user to be translated.

[3. Example of Operation for Displaying Translation Image in Information Processing Device 2]

The following description discusses, with reference to FIG. 5, an example of an operation for displaying a translation image in the information processing device 2. (A) of FIG. 5 illustrates the information processing device 2 in a case where the OCR section 11 has not recognized a text string contained in an input image. In this case, the input image is displayed as it is as the image D3.

(B) of FIG. 5 illustrates the information processing device 2 in a case where the OCR section 11 has recognized the text string contained in the input image. In this case, the image D4 is displayed in which displayed words W1 through W5 constituting a text string "Could you please rent them" contained in the input image are each decorated with an underline.

(C) of FIG. 5 illustrates the information processing device 2 at a point of time when the displayed word W2 expressing a word "you" is pressed with a user's finger 100 in a state shown in (B) of FIG. 5. At this point, the information processing device 2 carries out the processes in S103 through S105 described earlier.

(D) of FIG. 5 illustrates the information processing device 2 in a case where the displayed word W2 has been pressed as illustrated in (C) of FIG. 5 and the processes in S103 through S105 has been carried out. In this case, a translation image T2 expressing "あなた (ANATA)", which is a result of translating the word "you" into another language, is displayed while being superimposed on the displayed word W2 corresponding to the translation image T2. In a case where the translation image T2 is pressed with the user's finger 100 in this state, the translation image T2 is not displayed so that the displayed word W2 can be seen as illustrated in (B) of FIG. 5. As described above, a user can see, by use of the information processing device 2 of Embodiment 2, (i) a result of translation of a word constituting a text string contained in a captured image and (ii) the word before being translated.

Modified Example

In Embodiment 2, the information processing device 2 can be configured such that the processes in S103 through S107 are carried out for each word. That is, the information processing device 2 can be configured such that, in the state shown in (B) of FIG. 5, a translation image is separately displayed or not displayed for each of the displayed words W1 through W5 in accordance with an input carried out by a user.

In Embodiment 2, the information processing device 2 can be configured such that the information processing device 2 carries out, at a timing indicated by a in FIG. 6, a process for displaying a menu from which a user selects a process to be carried out with respect to a pressed word. Examples of processes selectable from the menu encompass a process for displaying a translation, a process for carrying out a search on specified dictionary software, and a process for carrying out a search on the Internet. The above configuration allows a user to select a process to be carried out with respect to a text string contained in a captured image.

In Embodiment 2, the information processing device 2 can be configured such that, instead of the process in S103, a process for translating a sentence containing words is to be carried out.

In Embodiments 1 and 2, a translation image can be translucent and the translation image can be displayed or not displayed by changing transparency of the translation image.

Embodiment 3

A control block (particularly, the control section 10) of the information processing device 1 can be realized by a logic circuit (hardware) provided in an integrated circuit (IC chip) or the like or can be alternatively realized by software as executed by a CPU (Central Processing Unit).

In the latter case, the information processing device 1 includes a CPU that executes instructions of a program that is software realizing the foregoing functions; ROM (Read Only Memory) or a storage device (each referred to as "storage medium") in which the program and various kinds of data are stored so as to be readable by a computer (or a CPU); and RAM (Random Access Memory) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

An information processing device (1) in accordance with Aspect 1 of the present invention includes: a text string decoration display control unit (text string decoration display control section 12) for causing a decorated image to be displayed in which a part indicating a text string contained in a captured image has been decorated; a translation image generating section (translation image generating section 13) for generating a translation image which is an image showing a result of translating the text string into another language; and a translation display control section (translation display control section 16) for causing the translation image corresponding to the text string to be displayed such that the translation image is superimposed on the part indicating the text string which is contained in the captured image or in the decorated image decorated by the text string decoration display control section, the translation display control section switching between display and non-display of the translation image in accordance with an input carried out by a user, and the text string decoration display control section causing the decorated image to be displayed in a case where the translation display control section has caused the translation image not to be displayed.

According to the configuration, in a state where a translation image corresponding to a text string contained in a captured image is displayed while being superimposed on a part indicating the text string contained in the captured image, it is possible to switch between (i) displaying an image in which the part indicating the text string contained in the captured image is decorated while the translation image is not displayed and (ii) displaying the translation image. This allows a user to easily see which text string has been translated, even after a translation of the text string contained in a captured image is displayed.

In Aspect 2 of the present invention, the information processing device in accordance with Aspect 1 of the present invention can be configured such that the text string decoration display control section decorates, for each word contained in the text string, the part indicating the text string contained in the captured image.

According to the configuration, a part indicating a text string contained in a captured image is decorated for each word of the text string. This allows a user to understand that the user can separately select each of words in the text string.

In Aspect 3 of the present invention, the information processing device in accordance with Aspect 2 of the present invention can be configured such that the translation image generating section generates, for the each word contained in the text string, a translation image which is an image showing a result of translating the each word into another language, and the information processing device further includes a selected word determination section (selected word determination section 17) for determining which word contained in the text string has been selected by an input carried out by a user, the translation display control section causing a translation image corresponding to a selected word to be displayed such that the translation image is superimposed on an image corresponding to the selected word which (i) has been determined by the selected word determination section to have been selected and (ii) has been decorated.

According to the configuration, a translation image corresponding to a selected word is displayed while being superimposed on an image corresponding to the selected word which (i) has been selected by a user and (ii) has been decorated. This allows the user to display a translation image of a word that is desired by the user to be translated.

In Aspect 4 of the present invention, the information processing device in accordance with any one of Aspects 1 through 3 of the present invention can be configured such that the text string decoration display control section causes an image to be displayed in which the part indicating the text string contained in the captured image has been underlined.

According to the configuration, a part indicating a text string contained in a captured image is underlined. This facilitates discrimination of the part indicating the text string contained in the captured image. Moreover, only a small portion of the captured image is hidden by decoration, and therefore a reduction in visible information is hardly caused by the decoration of the captured image.

The information processing device in accordance with the foregoing aspects of the present invention may be realized by a computer. In this case, the present invention encompasses: a control program for the information processing device which program causes a computer to operate as each section of the information processing device so that the information processing device can be realized by the computer; and a computer-readable storage medium storing the control program therein.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is applicable to a mobile phone, a smartphone, a PDA, and a PC each of which is connected to an image capturing device such as a camera.

REFERENCE SIGNS LIST

1: Information processing device
12, 112: Text string decoration display control section (Text string decoration display control unit)
13, 113: Translation image generating section (Translation image generating unit)
16, 116: Translation display control section (Translation display control unit)
17: Selected word determination section (Selected word determination unit)

The invention claimed is:
1. An information processing device comprising:
an image capturing device that optically captures an image;
a display device that displays a translation image on a screen;
an input device that receives an input of a user; and
at least one processor that:
controls the display device to display the image captured by the image capturing device;
translates, into another language, a text string contained in the image captured by the image capturing device;
generates the translation image which is an image showing a result of translation of the text string;
controls the display device to display the translation image corresponding to the text string such that the translation image is superimposed on the text string and that the text string is hidden by the translation image;

in response to the user selecting a portion of the translation image, switches between a display by the display device of the portion of the translation image so that a corresponding portion of the text string is hidden, and a non-display by the display device of the portion of the translation image so that the corresponding portion of the text string is not hidden; and controls the display device to display a GUI (graphical user interface) that receives the input of the user to control the processor to switch between the display and the non-display of the portion of the translation image.

2. The information processing device as set forth in claim 1, wherein:

the display device displays, on the screen, a decorated image in which a portion indicating the text string has been decorated;

the at least one processor:
decorates each word contained in the text string; and
controls the display device to display the decorated image in a case where the translation image is not to be displayed.

3. The information processing device as set forth in claim 2, wherein the at least one processor:

determines which word contained in the text string has been selected by the input of the user;
generates, for the each word contained in the text string, the translation image which is an image showing a result of translating the each word into another language; and
controls the display device to display the translation image corresponding to a selected word such that the translation image is superimposed on an image corresponding to the selected word which (i) has been determined by the at least one processor to have been selected and (ii) has been decorated.

4. The information processing device as set forth in claim 1, wherein the at least one processor controls the display device to display an image in which the portion indicating the text string contained in the captured image has been underlined.

5. A non-transitory computer-readable storage medium storing a control program for causing a computer to function as an information processing device recited in claim 1, the control program causing the computer to function as the at least one processor of the information processing device.

6. The information processing device as set forth in claim 2, wherein the at least one processor controls the display device to display an image in which the portion indicating the text string contained in the captured image has been underlined.

7. The information processing device as set forth in claim 3, wherein the at least one processor controls the display device to display an image in which the portion indicating the text string contained in the captured image has been underlined.

8. An information processing device comprising:
an image capturing device that optically captures an image;
a display device that displays, on a screen, the image captured by the image capturing device;
an input device that receives an input of a user; and
at least one processor that:

controls the display device to display a decorated image in which a portion indicating all text strings contained in the image captured by the image capturing device have been decorated by words, the decorated image including a selectable word; word;
controls the display device to display a result of a translation of the selectable word in accordance with the input of the user with respect to the selectable word;
in response to the user selecting the selectable word, switches between a display by the display device of the translation of the selectable word so that the selectable word is hidden, and a non-display by the display device of the translation of the selectable word so that the selectable word is not hidden; and
controls the display device to display a GUI (graphical user interface) that receives the input of the user to control the processor to switch between the display and the non-display of the translation of the selectable word.

9. The information processing device as set forth in claim 8, wherein the at least one processor:

determines which word contained in the text strings has been selected by the input of the user;
generates, for the each word contained in the text strings, the translation image which is an image showing a result of translating the each word into another language; and
controls the display device to display the translation image corresponding to a selected word such that the translation image is superimposed on an image corresponding to the selected word which (i) has been determined by the at least one processor to have been selected and (ii) has been decorated.

10. The information processing device as set forth in claim 8, wherein the at least one processor controls the display device to display an image in which the portion indicating the text strings contained in the decorated image have been underlined.

11. A non-transitory computer-readable storage medium storing a control program for causing a computer to function as an information processing device recited in claim 8, the control program causing the computer to function as the at least one processor of the information processing device.

12. The information processing device as set forth in claim 9, wherein the at least one processor controls the display device to display an image in which the portion indicating the text strings contained in the captured image have been underlined.

13. An information processing method comprising the steps of:

controlling a display device to display an image captured by an image capturing device;
translating, into another language, a text string contained in the image captured by the image capturing device;
generating a translation image which is an image showing a result of translation of the text string;
controlling the display device to display the translation image corresponding to the text string such that the translation image is superimposed on the text string and that the text string is hidden by the translation image;
in response to the user selecting a portion of the translation image, switching between a display by the display device of the portion of the translation image so that a corresponding portion of the text string is hidden, and a non-display by the display device of the portion of the translation image so that the corresponding portion of the text string is not hidden; and controlling the display device to display a GUI (graphical user interface) that receives the input of the user to control switching between display and non-display of the portion of the translation image.

14. An information processing method comprising the steps of:

controlling a display device to display a decorated image in which a portion indicating all text strings contained in an image captured by an image capturing device have been decorated by words, the decorated image including a selectable word;

controlling the display device to display a result of a translation of the selectable word in accordance with an input of a user with respect to the selectable word;

in response to the user selecting the selectable word, switching between a display by the display device of the translation of the selectable word so that the selectable word is hidden, and a non-display by the display device of the translation of the selectable word so that the selectable word is not hidden; and controlling the display device to display a GUI (graphical user interface) that receives the input of the user to control the processor to switch between the display and the non-display of the translation of the selectable word.

* * * * *